(12) United States Patent
Witkowski et al.

(10) Patent No.: US 7,379,933 B1
(45) Date of Patent: May 27, 2008

(54) UNION ALL REWRITE FOR AGGREGATE QUERIES WITH GROUPING SETS

(75) Inventors: Andrew Witkowski, Foster City, CA (US); Lei Sheng, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 559 days.

(21) Appl. No.: 10/305,737

(22) Filed: Nov. 27, 2002

(51) Int. Cl.
G06F 7/00 (2006.01)

(52) U.S. Cl. .................. 707/4; 707/1; 707/2; 707/3; 707/5

(58) Field of Classification Search .......... 707/3, 707/4, 5, 2, 1
See application file for complete search history.

(56) References Cited

U.S. PATENT DOCUMENTS

| | | | |
|---|---|---|---|
| 5,897,632 A * | 4/1999 | Dar et al. | 707/2 |
| 6,438,537 B1 | 8/2002 | Netz et al. | |
| 6,493,699 B2 | 12/2002 | Colby et al. | |
| 6,560,594 B2 | 5/2003 | Cochrane et al. | |
| 6,574,623 B1 * | 6/2003 | Leung et al. | 707/5 |
| 6,691,101 B2 * | 2/2004 | MacNicol et al. | 707/2 |
| 6,847,962 B1 * | 1/2005 | Cochrane et al. | 707/4 |
| 2002/0091707 A1 | 7/2002 | Keller | |
| 2002/0168621 A1 | 11/2002 | Cook et al. | |

* cited by examiner

*Primary Examiner*—Hung Q Pham
(74) *Attorney, Agent, or Firm*—Hickman Palermo Truong & Becker LLP (57) ABSTRACT

Query rewrite techniques are provided for rewriting an aggregate query with multiple groupings using multiple summary tables. The rewrite is accomplished by expanding the aggregate query into an equivalent UNION ALL query with multiple subqueries, each containing a single grouping. One or more of the subqueries is then rewritten to reference a summary table. Thus, a grouping of an aggregate query is derived by executing a subquery that either scans the summary table for the grouping, like in the exact-match mode, or by performing a roll-up operation, like in the roll-up mode. In addition, if the grouping of some of the subqueries cannot be derived from a summary table, subqueries are combined into another subquery that computes groupings from the base tables of the aggregate query.

22 Claims, 5 Drawing Sheets

UNION ALL REWRITE FOR AGGREGATE QUERIES WITH GROUPING SETS

RELATED APPLICATION

This application is related to U.S. patent application Ser. No. 10/077,828, entitled Evaluation of Hierarchical Cubes By Nesting Rollups, filed by Srikanth Bellamkonda, Abhinav Gupta, Andrew Witkowski, on Feb. 15, 2002, and herein incorporated by reference as originally set forth herein.

FIELD OF THE INVENTION

The present invention relates to database systems, and in particular, to rewriting queries to access materialized views.

BACKGROUND OF THE INVENTION

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

In a database used for "data warehousing" or "decision support", it is common for identical or closely related queries to be issued frequently. For example, a business may periodically generate reports that summarize the business facts stored in the DBMS, such as: "What have been the best selling brands of soft drinks in each of our sales regions, during the past six months?".

To respond to such queries, the DBMS typically has to perform numerous join, aggregation and ranking operations. The join, aggregation and ranking operations are performed to compute sum of sales and ranking to get the top selling brands.

When a DBMS contains very large amounts of data, certain queries processed by the DBMS can take an unacceptably long time to execute.

Materialized Views

Among commercial users of DBMSs, it has become a common practice to store the results of often-repeated queries in database tables or some other persistent database object. By storing the results of queries, the costly operations required to generate the results do not have to be performed every time the queries are issued. Rather, the database server responds to the queries by simply retrieving the pre-computed data.

These stored results are commonly referred to as materialized views. The contents of a materialized view is defined by metadata referred to as a view definition. The view definition contains mappings to one or more columns in the one or more tables containing the data. Typically, the view definition is represented as a database query that conforms to SQL.

Columns and tables that are mapped to a materialized view are referred to herein as base columns and base tables of the materialized view, respectively. The column and the base column mapped to the column may be referred herein to as the same field. The data maintained in the base columns is referred to herein as base data. The data contained in a materialized view is referred to herein as a materialized data.

Materialized views eliminate the overhead associated with gathering and computing the data every time a query is executed. DBMSs that are used for data warehousing frequently maintain materialized views that contain pre-computed summary information in order to speed up computation of queries through a process referred to as query rewrite.

Query rewrite refers to the process of evaluating a query and generating a rewritten query that requests the same information but can be executed more efficiently. A query may be rewritten and improved in many ways, among them is to rewrite a query to reference the materialized view, where the query before rewrite did not reference the materialized view. The query is rewritten in this way because the materialized view contains pre-computed information requested or needed by the query, saving much of the cost of re-computing the information already stored in the materialized view. Typically, the query rewrite optimization is transparent to the application submitting the query. That is, the rewrite operation happens automatically and does not require the application to know about the existence of materialized views, nor that a query that accesses a particular materialized view has been substituted for the original query. The query that is rewritten is referred to herein as a source query.

Aggregated Information

Materialized views are often used to stored pre-computed aggregated information. Aggregated information is information derived by applying an aggregate function, such as SUM, COUNT, or AVERAGE, to the values in a column of a group of rows in a "base table". Examples of aggregate functions are functions that sum values, calculate averages, and determine minimum and maximum values. The column that contains the values to which an aggregate function is applied is referred to as the measure. Materialized views that contain pre-computed summary information are referred to herein as "summary tables" or more simply, "summaries".

The groups of rows to which an aggregate function is applied are determined by values in a "group-by" column. The aggregate information generated by a database system is presented as a result set that includes columns that correspond to the group-by columns and the measure column. In particular, the result set has one row for each unique value in the group-by column. Each row in the result set corresponds to the group of rows in the base table containing the value for the group-by column of the row. The measure column in the row contains the output of the aggregate function applied to the values in the measure column of the group of rows.

Aggregate information is generated by a database system in response to receiving an aggregate query. An aggregate query specifies a group-by column, a measure column, and the aggregate function to apply to the measure values. A table that contains a group-by column or measure is referred to herein as a base table with respect to the aggregate query. The following query E1 is provided as an illustration.

select day, sum(sales)sum_s from t group by day

Base table t contains data representing the sales of an organization. Each row represents a particular sales transaction. For a particular row in table t, columns year, qtr, month, day, and sales contain values representing the year, quarter, month, day, and amount of a sales transaction, respectively.

The SELECT clause in query E1 contains "sum(sales)", which specifies that the aggregate function "sum" is to be applied to the values in column sales of table t. The query E2 also includes the group-by clause group by day, which denotes column d as the group-by column.

Computation of query E1 generates a result set with a column for d and sum (sales). A particular row in the result set represents the total sales for all sale transactions in a given day. Specifically, for a particular row in the result set, day contains a unique day value from table t for column day. Column sum_s contains the sum of the sales amount values in column sale for the group of rows from t that have the unique date value in column day.

It is often useful to generate aggregate information grouped by multiple columns. For example, it may be useful to generate a result set that summarizes sales by year, and for each year, by month. Such a result set may be generated by referencing month and day in a group-by clause, as illustrated by the following query E2.

select month, day, sum(sales)aum_s from t group by month, day A set of rows that contains aggregate information for a measure and that is grouped by of a particular set of columns is referred to herein as a grouping. A grouping is identified by the columns by which the grouping is formed. The grouping specified by the group-by clause of query E2 is (month, day). As a convenience of expression, a query is referred to herein as containing a grouping the query defines.

Another useful way to provide aggregate information is to generate one result set that includes multiple groupings. An example of such a result set is one that contains one set of rows grouped by month and day, and another set grouped only by month. Such a result set may be generated by submitting a query that includes extended group-by operators.

Extended group-by operators define multiple groupings. Examples of group-by operators include cube, rollup, and grouping sets. The group-by operators are used to specifying multiple groupings. For example, the following query E3 uses a cube operator to specify multiple groupings.

select month, day, sum(sales) from t group by cube (month, day)

The cube operator denotes that the result set should include groupings based on particular combinations of the argument columns. In particular, the operator "cube (a,b)" specifies groupings (a,b), (a), (b), and ( ).

The grouping-set operator allows a user to explicitly define multiple groupings. For example, the following query E4 includes a grouping-set operator that specifies the groupings (year, qtr, month, day) and (year).

select year, qtr, month, day sum(sales)
      from t
      group by group sets ((year, qtr, month, day), (year))

Query Rewrite Limitations

Query rewriting of aggregate queries to access a summary table can save substantial computational resources. Because the present application focuses on rewriting aggregate queries to access a summary table, the term query rewrite shall be used hereinafter to refer to rewriting aggregate queries to access a summary table. Unfortunately, query rewrite of aggregate queries suffers from a significant limitation that limits when an aggregate query that contains multiple groupings may be rewritten. That limitation is that an aggregate query can be rewritten to reference a single summary table whose base grouping may be used to compute the base grouping of an aggregate query. A base grouping for an aggregate query or summary table is a grouping that includes all columns in the other groupings of the aggregate query or summary table. All the groupings of the aggregate query or materialized view may be computed from the base grouping. Base groupings are illustrated below.

Based on this limitation, aggregate queries are written in one of two query rewrite modes that involve rewriting the query to reference just one summary table. In the first mode, referred to herein as the exact match mode, an aggregate query is rewritten to access a summary table if the summary table has all the groupings specified in the aggregate query.

If no such summary table satisfies this condition, then an aggregate query may be rewritten in the second mode if the base grouping of the aggregate query can be computed using the base grouping of a summary table. The second mode is referred to herein as the "roll-up" mode. To illustrate query rewrite and the limitation that restricts when an aggregate query maybe rewritten, the following query Q1, Q2, MV1, and MV2 are provided in Table 1.

TABLE 1

| Name of query or materialized view | Query Statement or Materialized View Def. |
|---|---|
| MV1 | create materialized view MV1 as<br>select year, qtr, month, day, sum(sales) s<br>from t<br>group by year |
| MV2 | create materialized view MV2 as<br>select year, sum(sales) s<br>from t<br>group by year, qtr, month, day |
| Q1 | select year, qtr, month, day, sum(sales)<br>from t<br>group by year |
| Q2 | select year, qtr, month, day, sum(sales)<br>from t<br>group by grouping sets ((year, qtr, month, day) (year)) |
| Q1' | select year, qtr, month, day, s<br>from MV1 |
| Q1'' | select year, qtr, month, day, sum(s)<br>from MV2<br>group by year |
| Q2' | select year, qtr, month, day, sum(s)<br>from MV2<br>group by grouping sets ((year, qtr, month, day) (year)) |

MV1 and MV2 are depicted using a data definition language ("DDL") statement that defines the summary table in a DBMS.

Query Q1 can be rewritten to access MV1 in the exact-match mode. Specifically, query Q1 and MV1 contain the same groupings, which in this case is (year). Thus, query Q1 can be rewritten as Q1' as shown in Table 2.

TABLE 2

| Name of query | Query Statement |
|---|---|
| Q1' | select year, qtr, month, day, s<br>from MV1 |
| Q1'' | select year, qtr, month, day, sum(s)<br>from MV2<br>group by year |
| Q2' | select year, qtr, month, day, sum(s)<br>from MV2<br>group by grouping sets ((year, qtr, month, day) (year)) |

If MV1 did not exist, then query Q1 can be rewritten in the roll-up mode as query Q1" (see Table 2), which references MV2, because the base grouping in Q1 can be computed from the base grouping of MV2. Specifically, MV2 and Q1 each contain only one grouping, which by definition, makes the grouping a base grouping. Thus, the base groupings of MV2 and Q1 are (year, qtr, month, day) and (year), respectively. The grouping (year) can be computed by aggregating the grouping (year, qtr, month, day) within MV2. The process of computing a grouping by aggregating another grouping is referred to herein as a "roll-up operation."

Unlike query Q1, which can be computed under either the exact-match mode and the roll-up mode, query Q2 can only be computed under the roll-up mode, by rewriting Q2 to Q2', which references MV2 (see Table 2). The base grouping of Q2, which is (year, qtr, month, day), cannot be computed from the base grouping of MV1, which is (year). However, the base grouping of Q2 can be computed from the base grouping of MV2, which is also (year, qtr, month, day). The other grouping of Q2, (year), can be computed from the base grouping of MV2 through a roll-up operation.

Note that both MV1 and MV2 contain pre-computed groupings that may be used to compute the pair of groupings contained in Q2 without having to perform a roll-up operation. In general, rewritten queries that perform no roll-up operation are performed more efficiently. However, because of the limitation placed on query rewrite discussed above, Q2 may be rewritten to reference only summary table MV2. As a result, a roll-up operation is required to compute one of the groupings despite the fact the grouping has already been computed in another summary table.

Furthermore, if some but not all of the groupings in an aggregate query can be computed from a summary table, then query rewrite is barred, even though there may be summary table from which some of the groupings in the aggregate query may be computed. In this case, a database system is forced to fully compute the aggregate query from the base tables, a far more expensive way to compute an aggregate query than computing it from a summary table. Based on the foregoing, it is desirable to provide a query rewrite process not subject to the limitation discussed above.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for rewriting aggregate queries is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Query rewrite techniques are provided for rewriting an aggregate query with multiple groupings using multiple summary tables. The rewrite is accomplished by expanding the aggregate query into an equivalent UNION ALL query with multiple subqueries, each containing a single grouping. One or more of the subqueries is then rewritten to reference a summary table. Thus, a grouping of an aggregate query is derived by executing a subquery that either scans the summary table for the grouping, like in the exact-match mode, or by performing a roll-up operation, like in the roll-up mode. In addition, if the grouping of some of the subqueries cannot be derived from a summary table, subqueries are combined into another subquery that computes groupings from the base tables of the aggregate query.

Figure 1:
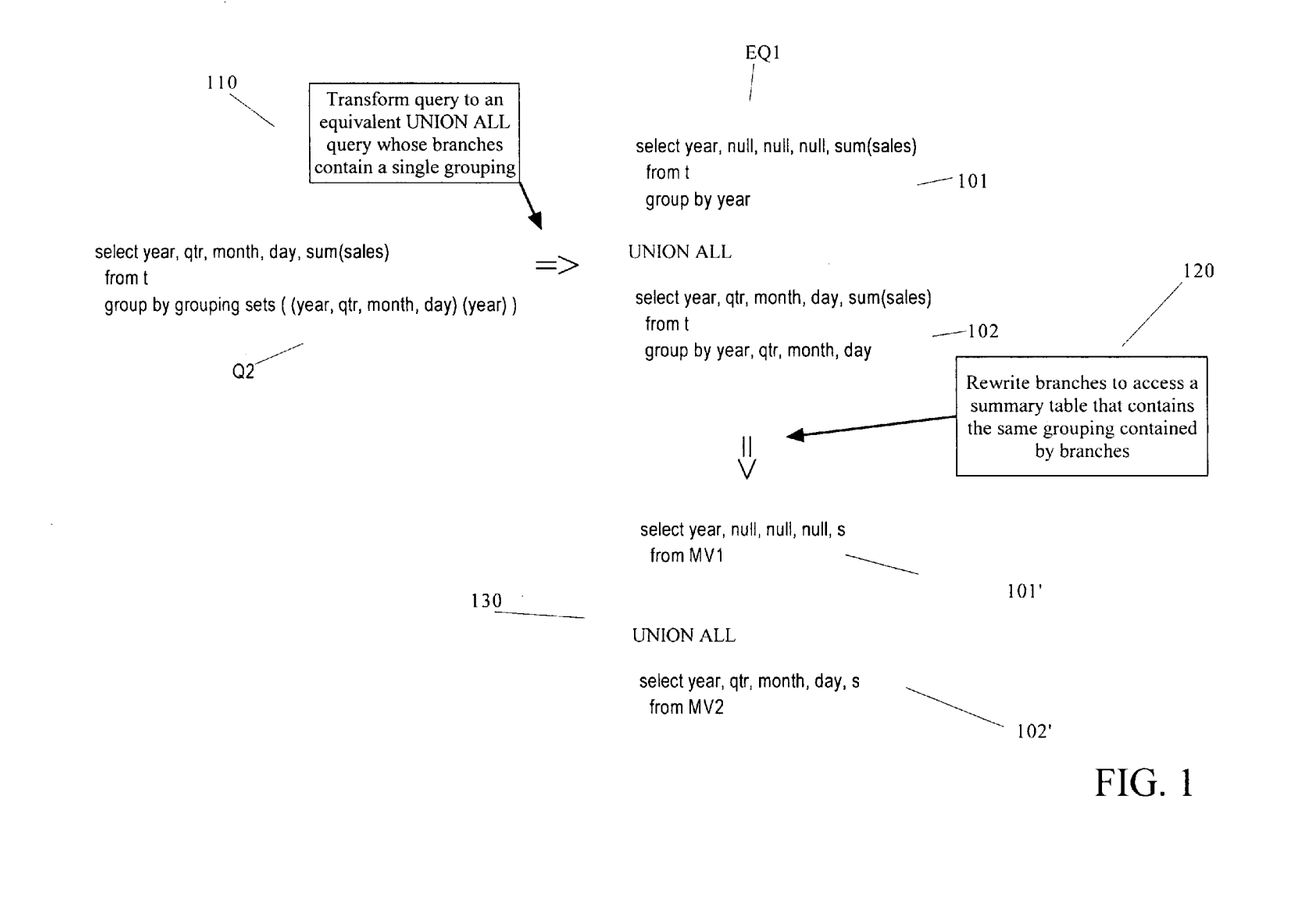
FIG. 1 is a diagram depicting a query rewrite process according to an embodiment of the present invention.

FIG. 1 depicts a process for query rewrite according to an embodiment of the present invention. The process is illustrated using query Q2, MV1, and MV2. The query is transformed in two basic stages. Referring to FIG. 1, in the first stage 110, query Q2 is transformed into an equivalent UNION ALL query EQ1, which contains multiple branch subqueries ("branches"), each branch containing a single grouping from query Q2. Branch 301 contains the grouping (year), while branch 102 contains the grouping (year, qtr, month, day).

When creating an equivalent UNION ALL query, ANSI standards regarding aggregate queries and UNION ALL queries are accounted for. These requirements include that the result sets returned by each branch of the UNION ALL query should have the same shape. That is, the result sets should have the same sequence of the same or equivalent columns. The grouping of some branches will not include columns in the result set. To form branches that comply with ANSI standards, the branches are defined so that they return a NULL constant for the missing columns. This is accomplished by referencing in the select-list of a branch the NULL constant in the position corresponding to the missing column.

For example, the grouping for branch 101 is missing the columns qtr, month, and day. The select-list of the select-clause in branch 101 references the NULL constant in the positions corresponding to those of the missing columns.

After the first stage 110, for each branch, it is determined whether there is a summary table that can be used to rewrite the branch. A branch for which it has been determined that there is a summary table that may be used to rewrite the branch is referred to herein as a matched branch. The summary table that is used to rewrite a matched branch is referred to herein as a matched summary table or as matching the branch.

If every branch is matched, then the second stage 120 is performed. In stage 120, each branch is rewritten to reference a matched summary table to form a rewritten query.

In the current example, MV1 and MV2 are summary tables that contain the groupings of branches 101 and 102. Therefore, these branches may be rewritten under the exact match mode as branch 101' and 102', which reference MV1 and MV2, respectively, to form rewritten query 130. Rewritten query 130, and in particular, branches 101' and 102', maybe computed without performing a roll-up operation, an especially efficient way for executing a rewritten aggregate query.

Rewrites When Only Some Branches are Matched

Figure 2:
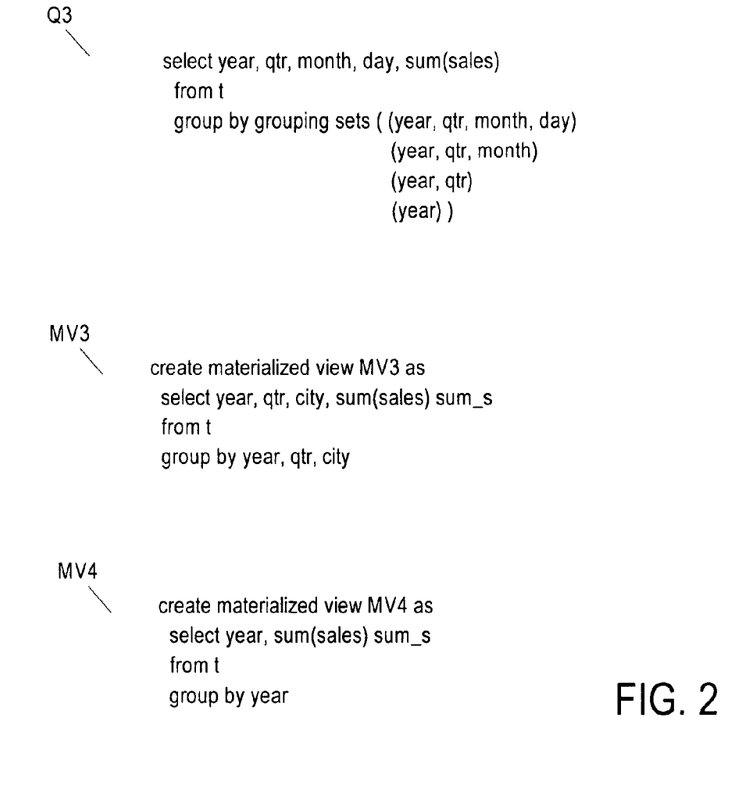
FIG. 2 is a diagram depicting aggregate queries and summary tables used to illustrate an embodiment of the present invention.
Figure 3:
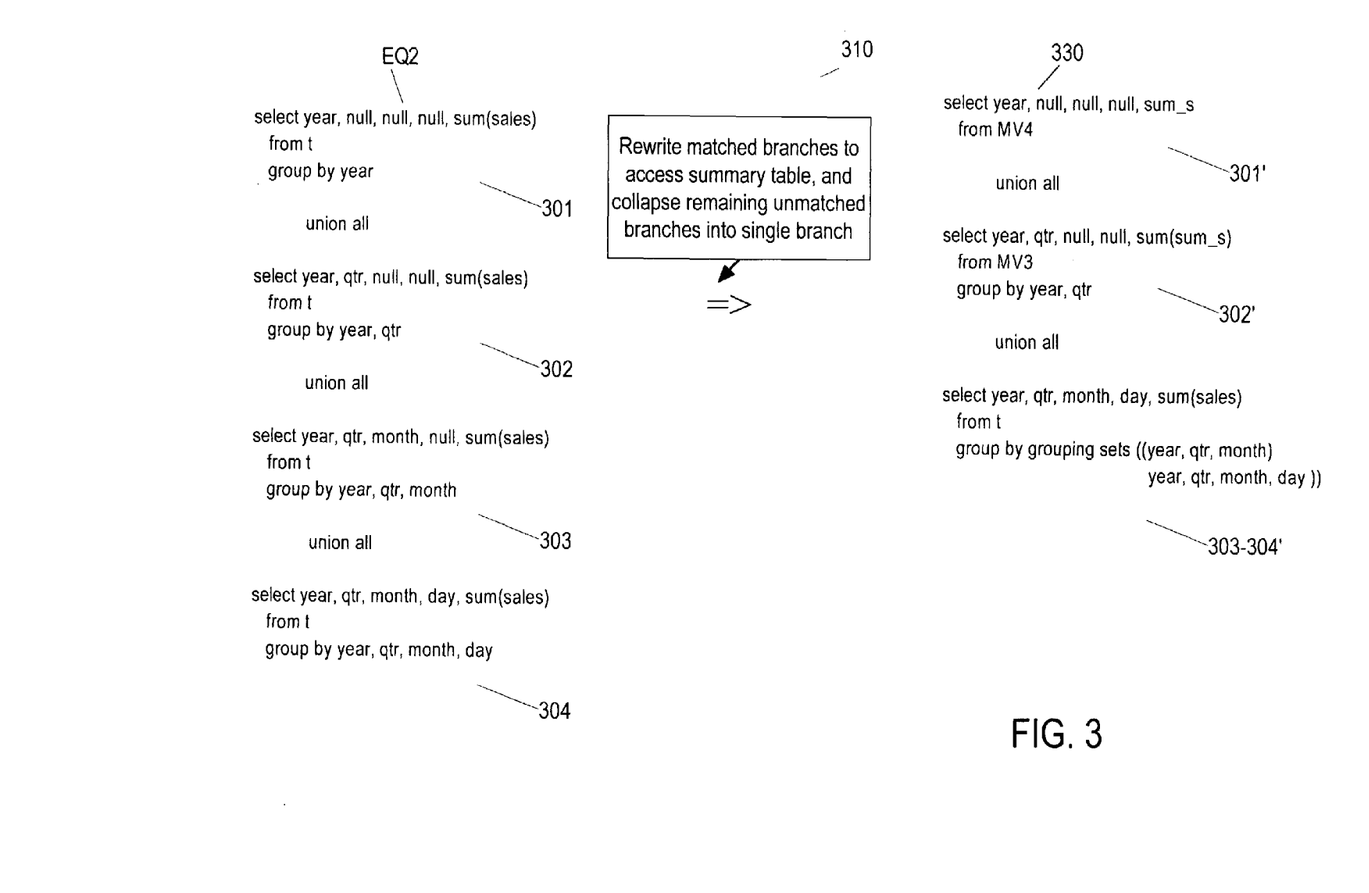
FIG. 3 is a diagram depicting a query rewrite process according to an embodiment of the present invention.

Some aggregate queries may only be reduced to an equivalent UNION ALL query that has some branches that can be matched and some that cannot be. According to another embodiment of the present invention, such aggregate queries may nevertheless be rewritten in a way that is able to at least exploit the matched summary tables. FIG. 2 shows illustrative aggregate query Q3 and summary tables MV3 and MV4 used to illustrate how an aggregate query may be rewritten in this way. FIG. 3 depicts this type of rewrite.

The rewrite begins by generating an equivalent UNION ALL query of the source query as previously described for stage 110. FIG. 3 shows the equivalent UNION ALL query EQ2 generated for query Q3. Equivalent UNION ALL query EQ2 includes branches 301, 302, 303, and 304, which contain groupings (year), (year, qtr), (year, qtr, month), and (year, qtr, month, day), respectively.

At stage 310, the branches that can be rewritten to refer to a summary table are rewritten to refer to the summary table. The remaining unmatched branches are rewritten by "collapsing" them into a single query that references the base table(s) of the source query. Collapsing the unmatched branches into a branch subquery may allow them to be computed more efficiently by a DBMS than computing each unmatched branch alone.

In the current example, FIG. 3 shows rewritten query 330, which is generated by rewriting EQ2 branch by branch in stage 310. In particular branch 301 was rewritten under the exact match mode to branch 301', which references MV4. Branch 302 was rewritten under the roll-up mode into branch 302', which references MV3. Branches 303 and 304, which have no matching summary table, are collapsed into branch 303-304', which references the base table of aggregate query Q3 and contains the groupings (year, qtr, month) and (year, qtr, month, day).

SOME ALTERNATE EMBODIMENTS

The present invention has been illustrated using particular types of aggregate queries and summary tables, but the present invention is not limited to these types of aggregate queries. For example, the present invention has been illustrated by rewriting aggregate queries that use the group set extended group-by operator and aggregate queries that have one base table. However, rewrite techniques described herein may be used to rewrite aggregate queries that use other types of group-by operators, such as cube and roll-up, and to rewrite aggregate queries based on joins between multiple tables.

Furthermore, the present invention was illustrated by rewriting aggregate queries into another query referencing a summary table that contains just one group. However, the present invention is not so limited. An aggregate query maybe transformed into a query referencing a summary table that contains multiple groupings.

Figure 4:
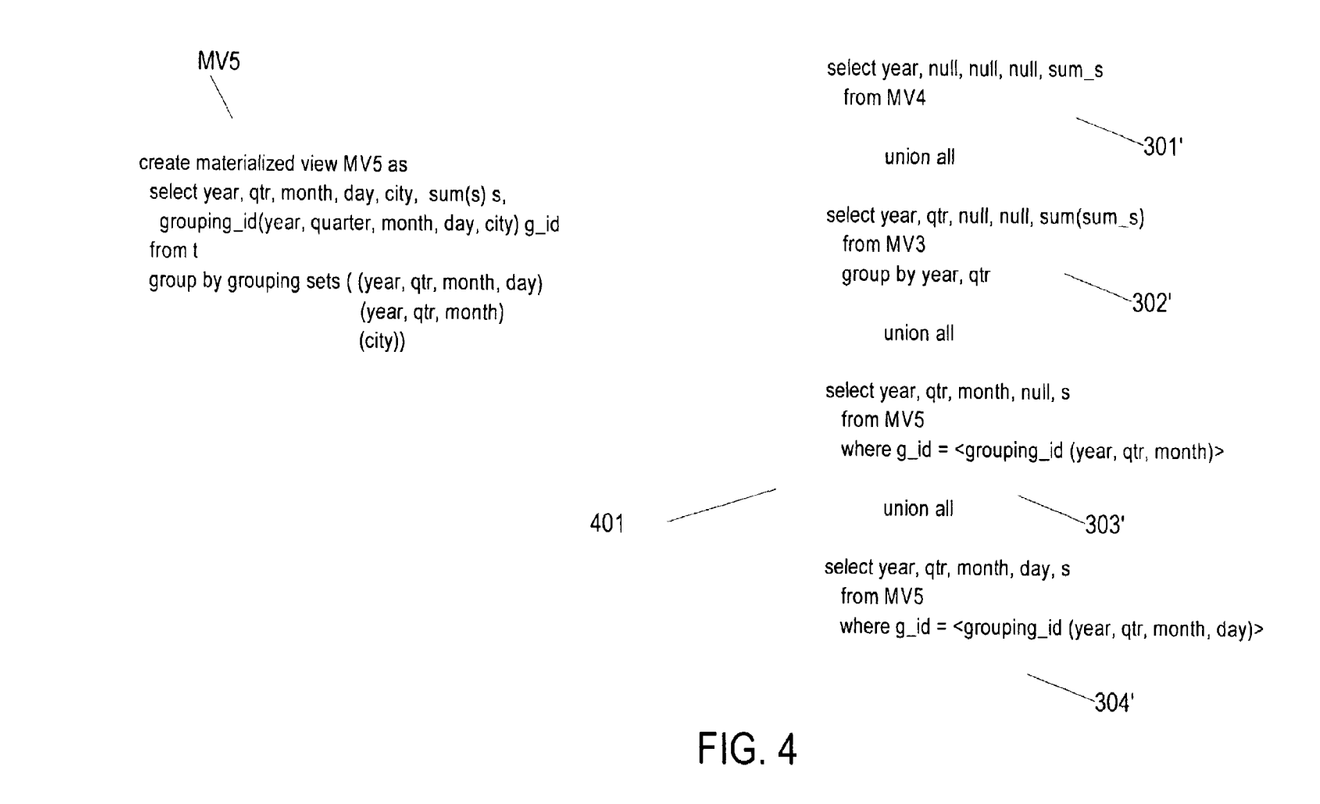
FIG. 4 is a diagram depicting a query rewrite process according to an embodiment of the present invention.

FIG. 4 is a diagram that depicts a summary table containing multiple groupings and how it may be used to rewrite query Q3. Referring to FIG. 4, MV5 contains multiple groupings (year, qtr, month, day), (year, qtr, month), (year, qtr), (year). MV5 also contains a column containing the output of an invocation of function grouping_id(year, qtr, month, day, city). A grouping id function generates a value that identifies a grouping to which a particular row belongs. Grouping functions are described in greater detail in Evaluation of Hierarchical Cubes By Nesting Rollups. A grouping function may be used in a query predicate to filter in rows that belong to a particular grouping. Thus, a branch may be rewritten to reference a multi-grouping summary table by including a predicate filter to filter in the grouping from which the branch's grouping may be derived.

In the example of rewriting of Q3, branches 303 and 304, rather than being collapsed, may each be rewritten to access MV5, to produce rewritten query 401, as shown in FIG. 4. In particular, branch 303 is rewritten to branch 303', which references MV5 and includes the Predicate "g_id = <grouping_id (year, qtr, month)>" to filter in the grouping (year, qtr, month) in MV5. Branch 304 is rewritten to branch 304', which references MV5 and includes the predicate "g_id = <grouping_id (year, qtr, month, day)>" to filter in the rows in grouping (year, qtr, month, day) in MV5.

Hardware Overview

Figure 5:
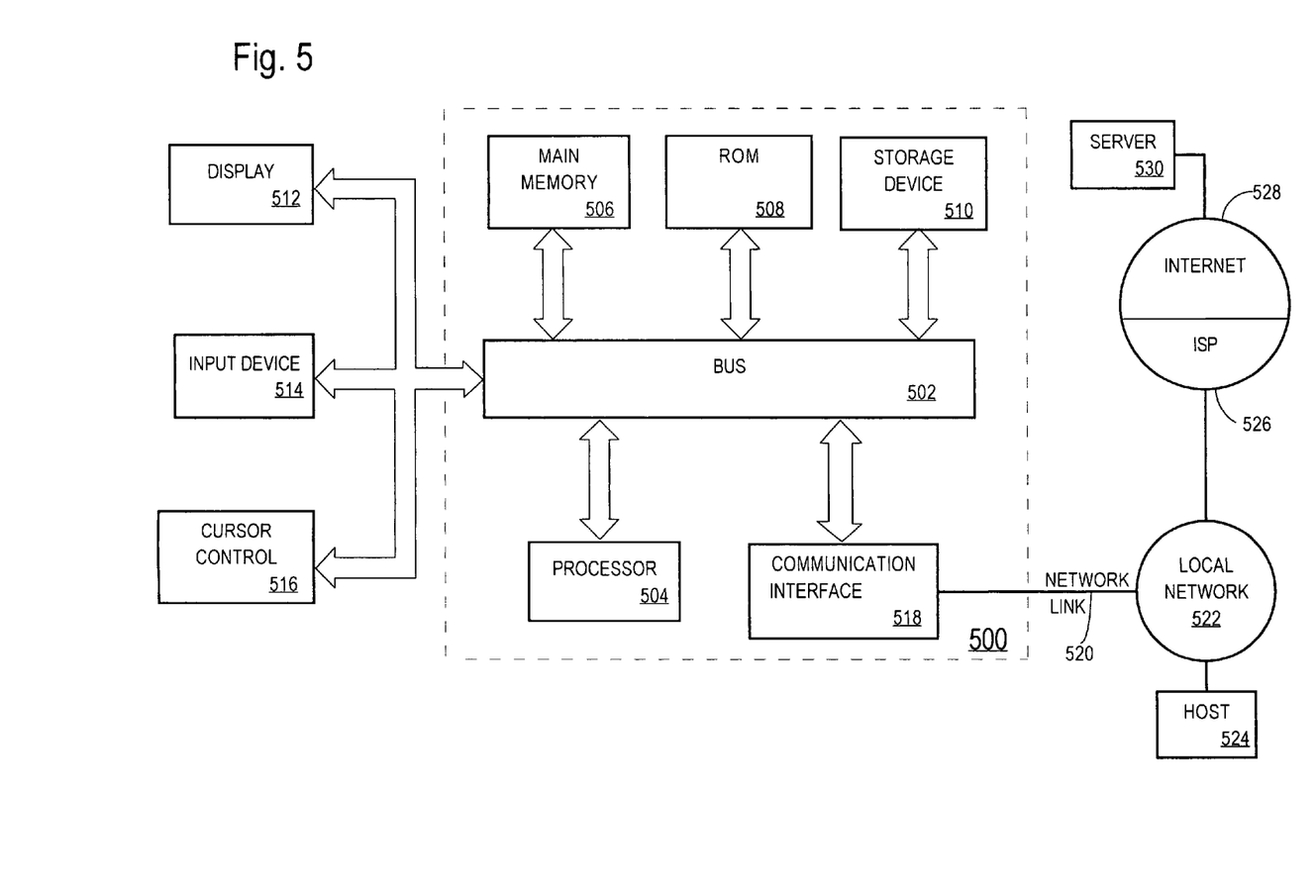
FIG. 5 is a diagram depicting a computer system which may be used to implement an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for query rewriting, the method comprising the steps of:

receiving a first query that defines a plurality of groupings and an aggregation operation based on information in one or more base tables;

wherein a group-by clause in said first query defines said plurality of groupings;

wherein said first query does not refer to a particular summary table;

wherein said plurality of groupings contains at least one grouping that cannot be derived from any grouping contained in said particular summary table;

representing said first query as a second query that defines a UNION ALL operation between a plurality of subqueries, wherein each subquery of said plurality of subqueries contains a grouping of said plurality of groupings; and transforming said second query into a third query that references a plurality of summary tables, wherein said plurality of summary tables includes said particular summary table;

wherein the third query requests the same information as the first query.

2. The method of claim 1, wherein the step of transforming includes:

for at least one subquery of said plurality of subqueries, rewriting said at least one subquery into another subquery that references said particular summary table.

3. The method of claim 2, wherein said at least one subquery contains a grouping identical to a particular grouping in said particular summary table, wherein the step of rewriting said at least one subquery includes rewriting said at least one subquery into another subquery that does not define a roll-up operation based on said particular grouping in said particular summary table.

4. The method of claim 2, wherein the step of transforming includes collapsing two or more subqueries of said plurality of subqueries into another subquery that references one or more base tables.

5. The method of claim 2, wherein said particular summary table contains multiple groupings.

6. The method of claim 5, wherein:

said particular summary table contains a particular column that identifies a particular grouping of said multiple groupings; and wherein the step of transforming includes causing said other subquery to include a predicate that filters based on said column.

7. The method of claim 2, wherein:
said second query includes said at least one subquery and a second subquery; and
the step of rewriting includes rewriting said second subquery into a third subquery that references said particular summary table.

8. The method of claim 1, wherein said plurality of summary tables include at least two summary tables.

9. The method of claim 1, wherein said third query references at least one table of said one or more base tables.

10. The method of claim 1, wherein said group-by clause includes an extended group-by operator that defines said plurality of groupings.

11. The method of claim 1, wherein each grouping of said plurality of groupings is a corresponding set of rows in a plurality of sets of rows, wherein said plurality of sets of rows are included in the result set that would be returned by computing said first query, and wherein said corresponding set of rows is grouped according to one or more columns, specified in said group-by clause, that identify said each grouping.

12. A computer-readable storage medium storing one or more sequences of instructions for query rewriting, wherein execution of the one or more sequences of instructions by one or more processors causes the one or more processors to perform the steps of:
receiving a first query that defines a plurality of groupings and an aggregation operation based on information in one or more base tables;
wherein a group-by clause in said first query defines said plurality of groupings;
wherein said first query does not refer to a particular summary table;
wherein said plurality of groupings contains at least one grouping that cannot be derived from any grouping contained in said particular summary table;
representing said first query as a second query that defines a UNION ALL operation between a plurality of subqueries, wherein each subquery of said plurality of subqueries contains a grouping of said plurality of groupings; and
transforming said second query into a third query that references a plurality of summary tables,
wherein said plurality of summary tables includes said particular summary table;
wherein the third query requests the same information as the first query.

13. The computer-readable storage medium of claim 12 wherein the step of transforming includes:
for at least one subquery of said plurality of subqueries, rewriting said at least one subquery into another subquery that references said particular summary table.

14. The computer-readable storage medium of claim 13, wherein said at least one subquery contains a grouping identical to a particular grouping in said particular summary table, wherein the step of rewriting said at least one subquery includes rewriting said at least one subquery into another subquery that does not define a roll-up operation based on said particular grouping in said particular summary table.

15. The computer-readable storage medium of claim 13, wherein the step of transforming includes collapsing two or more subqueries of said plurality of subqueries into another subquery that references one or more base tables.

16. The computer-readable storage medium of claim 13, wherein said particular summary table contains multiple groupings.

17. The computer-readable storage medium of claim 16, wherein:
said particular summary table contains a particular column that identifies a particular grouping of said multiple groupings; and
wherein the step of transforming includes causing said other subquery to include a predicate that filters based on said column.

18. The computer-readable storage medium of claim 13, wherein:
said second query includes said at least one subquery and a second subquery; and the step of rewriting includes rewriting said second subquery into a third subquery that references said particular summary table.

19. The computer-readable storage medium of claim 12, wherein said plurality of summary tables include at least two summary tables.

20. The computer-readable storage medium of claim 12, wherein said third query references at least one table of said one or more base tables.

21. The computer-readable storage medium of claim 12, wherein said group-by clause includes an extended group-by operator that defines said plurality of groupings.

22. The computer-readable storage medium of claim 12, wherein each grouping of said plurality of groupings is a corresponding set of rows in a plurality of sets of rows, wherein said plurality of sets of rows are included in the result set that would be returned by computing said first query, and wherein said corresponding set of rows is grouped according to one or more columns, specified in said group-by clause, that identify said each grouping.

* * * * *

UNITED STATES PATENT AND TRADEMARK OFFICE
CERTIFICATE OF CORRECTION

PATENT NO. : 7,379,933 B1
APPLICATION NO. : 10/305737
DATED : May 27, 2008
INVENTOR(S) : Witkowski et al.

Page 1 of 1

It is certified that error appears in the above-identified patent and that said Letters Patent is hereby corrected as shown below:

In column 3, line 25, after "sum(sales)" delete "aum_s".

In column 8, line 15, delete "Predicate" and insert -- predicate --, therefor.

In column 11, line 48, in claim 13, after "12" insert -- , --.

Signed and Sealed this

Seventh Day of July, 2009

JOHN DOLL
*Acting Director of the United States Patent and Trademark Office*